UNITED STATES PATENT OFFICE.

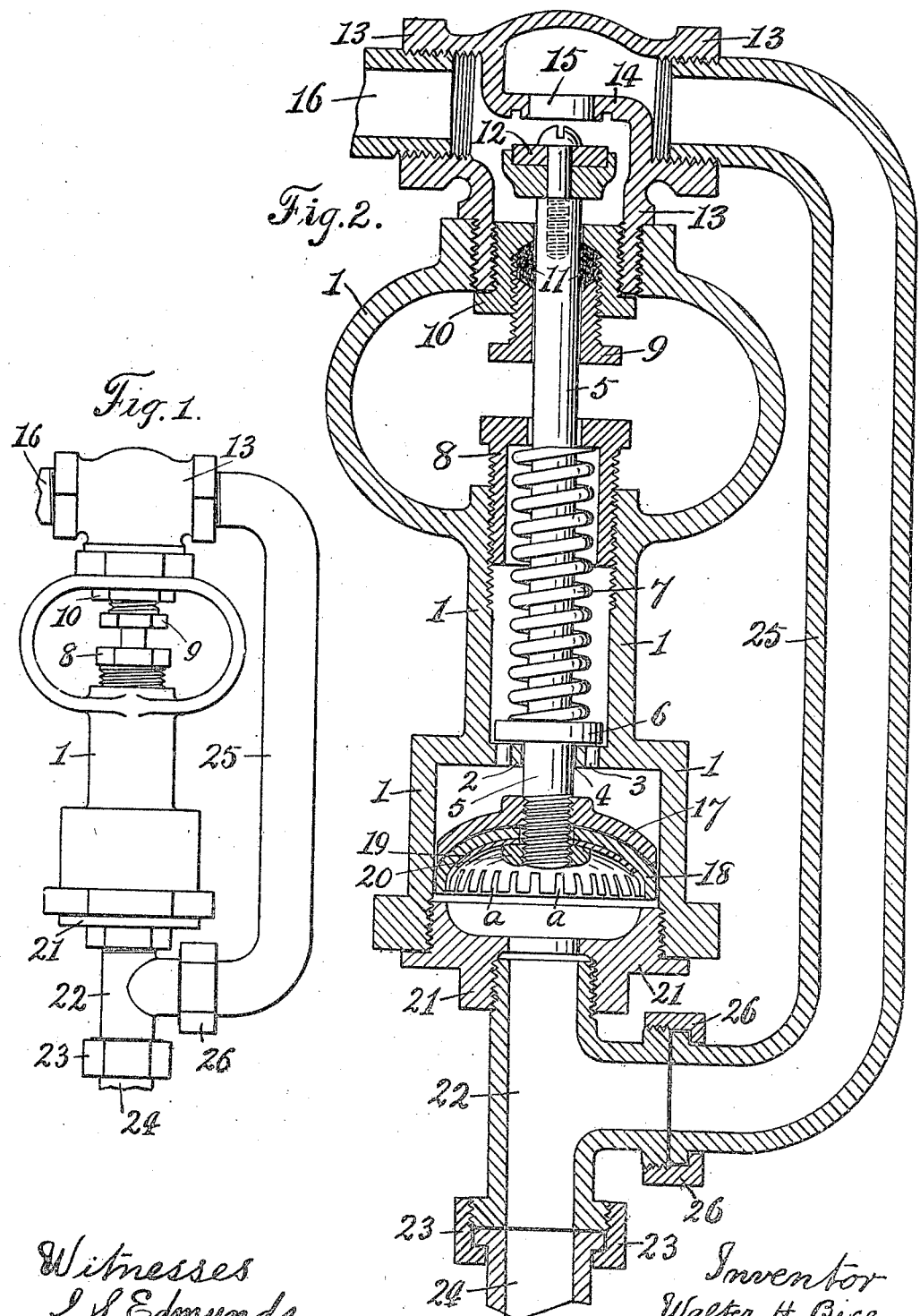

WALTER H. BICE, OF MAPLE LODGE, ONTARIO, CANADA, ASSIGNOR OF ONE-HALF TO ALFRED WESTMAN AND ONE-SIXTH TO WILLIAM R. COLBY, OF LONDON, CANADA.

AUTOMATIC PRESSURE-REDUCTION VALVE.

952,410.  Specification of Letters Patent.  Patented Mar. 15, 1910.

Application filed May 25, 1909. Serial No. 498,367.

*To all whom it may concern:*

Be it known that I, WALTER H. BICE, a subject of the King of Great Britain, and a resident of Maple Lodge, in the county of Middlesex, in the Province of Ontario, Canada, have invented a new and useful Automatic Pressure-Reduction Valve, of which the following is a specification.

This invention relates particularly to a valve used in reducing fluid pressure. And it consists of the improved construction and novel combination of parts of the same as will be hereinafter first fully set forth and described and then pointed out in the claims, reference being had to the accompanying drawings forming part of this specification wherein;—

Figure 1 is a side view of an automatic pressure reducing valve embodying my invention. Fig. 2 is an enlarged sectional view of same.

In the accompanying drawings, the numeral 1 indicates the body of the valve provided with the partition 2 in which partition 2 the vents 3 and the passage 4 for the spindle 5 are formed.

5 indicates the spindle provided with a collar 6 the lower end of which spindle 5 passes through the passage 4 in the partition 2 and the collar 6 rests on said partition 2 as shown in Fig. 2 of the accompanying drawings. Immediately above and resting on the collar 6 is a spring 7, and said spring 7 is held in this body 1 by a pressure plug 8 which is screw threaded into and engages with a screw thread on the inner face of the body 1 as shown.

9 indicates a packing nut, 10 a bonnet, and 11 a packing between the packing nut 9 and bonnet 10, and 12 is a valve on the end of said spindle 5 as shown.

13 is a supplemental body provided with a partition 14, which partition 14 is provided with a valve seated opening 15 with which valve seated opening 15 the valve 12 on the end of the spindle 5 is adapted to engage, when required. Said packing nut 9 is screw threaded on the outer face and engages with a screw thread on the inner face of the bonnet 10 as shown, and said packing 11 is held in place between this packing nut 9, bonnet 10 and around the spindle 5, as shown. The bonnet 10 is also provided with a screw thread on its outer face which engages with a screw thread on the inner face of the supplemental body 13, and a screw thread on the outer face of said supplemental body 13 engages with a screw thread on the inner face of the main body 1, as shown.

16 is a water or other fluid pipe one end of which is connected to and opens into the supplemental body 13, and the other end is connected to the source of supply, not shown.

17 indicates a brass cap, 18 a rubber cup, 19 a thin brass cup inside of the rubber cup 18, and said brass cup 19 is serrated or partly cut away as shown at, *a*, to cause it to assume the same shape as the rubber cup 18 and to cause it to spring and press against said rubber cup, to hold the latter against the inside of the body 1. The brass cap 17 is provided with a screw thread on its inner face which engages with a screw thread on the outer face of the spindle 5, as shown, and the rubber cup 18 and brass cup 19 serrated as described is secured on this spindle 5 against the brass cap 17 by a nut 20 on the lower end of said spindle 5.

21 is a bushing screw threaded on the outer face which engages with a screw thread on the inner face of the body 1, and a T-coupling 22 is screw threaded at one end on the outer face which engages with a screw thread on the inner face of the bushing 21, and the other end of this T-coupling is screw threaded on the outer face, with which a union nut 23 is adapted to engage, and said union nut 23 is adapted to engage with the supply pipe 24.

25 is a pipe connected to and opening into one end of the supplemental body 13 as shown, and said pipe 25 is connected to and opens into one side of the T-coupling 22 by a union nut 26 as shown.

The operation is as follows:—The water or other fluid enters the pipe 16 and passes through the supplemental body 13, by passing through the valve seated opening 15 in the partition 14 in said supplemental body. It then passes through the pipe 25 and T-coupling 22 to the pipe 24 and from the latter to the building. When the pressure of the water or other fluid in the pipe 24 is greater than that required to carry the water or other fluid to its destination in the building, the water or other fluid in the pipe 24 acts on the valve cup combination 17, 18 and 19 attached to the spindle 5 by the nut 20 and overcomes the tension of the spring 7, this raises the spindle 5 and valve 12 to close it on the seat 15. The spring 7 having been previously set slightly above the pressure required to carry the water or other fluid to its destination in the building. When the pressure of the water or other fluid in the pipe 24 has been released, the spring 7 automatically operates the spindle 5 to open the valve 12 or to remove the valve 12 from the seat 15.

This construction of an automatic pressure reduction valve forms a simple device because there is no complex machinery to get out of repair; it forms a durable device because there is comparatively no wear; and it is an economical device because there is a great saving of water or other fluid owing to the fact that in case of leakage of pipes, the pressure is reduced, less water or other fluid therefore will go to waste; and because of reduction of pressure, there will be a great saving in plumbing repairs especially at the water taps; and because this valve may be set at any pressure an average of twenty pounds pressure being required to carry the water up three stories, these facts recommend this valve not only to the municipality who furnish the water, but also to the consumer who reaps the benefits of the reduced price of water and plumbing repairs.

Having thus described my invention, I claim:

1. In a device of the class described, a main body provided with a chamber and further provided with a partition having a passage formed therein, a supplemental body secured to said main body and provided with a valve seat, a spindle formed with a collar and its motion limited thereby through said passage in said partition, a spring around said spindle and resting against said collar on said spindle, and a pressure plug engaging with said main body and adapted to abut against said spring, a valve carried by the spindle and adapted to engage said seat in combination with a piston operating in said chamber and comprising a brass cap, a rubber cup a brass cup, and a nut secured near one end to said spindle for securing the cap and cups in position, and means for conducting the fluid to said chamber, substantially as shown and described and for the purpose specified.

2. In a device of the class described, a supplemental body provided with a partition and a valve seat formed in said partition, a pipe leading into said supplemental body, a main body provided with a partition having a passage and vents, and to which main body said supplemental body is secured, a spindle formed with a collar its motion being limited thereby through said passage in said partition, a valve on the upper end of said spindle, a spring around said spindle and resting against said collar on said spindle, and a pressure plug engaging with said main body and adapted to abut against said spring, in combination with a T-coupling secured to the lower end of said main body, a pipe extending from and opening into said supplemental body and said T-coupling, and a pipe leading from said T-coupling, substantially as shown and described and for the purpose specified.

3. In a device of the class described, a supplemental body provided with a partition and a valve seat formed in said partition, a pipe leading into said supplemental body, a main body provided with a piston chamber and further with a partition having a passage and vents and to which main body said supplemental body is secured, a spindle formed with a collar its motion being limited thereby through said passage in said partition, a valve on the upper end of said spindle, a spring around said spindle and resting against said collar on said spindle, and a pressure plug engaging with said main body and adapted to abut against said spring, in combination with a piston carried by the spindle and positioned in said chamber, a T-coupling secured to said main body and opening into the piston chamber below the piston, a pipe extending from and opening into said supplemental body and said T-coupling, and a pipe leading from the T-coupling, substantially as shown and described and for the purpose specified.

In testimony whereof, I have signed in the presence of the two undersigned witnesses.

WALTER H. BICE.

Witnesses:
P. J. EDMUNDS,
P. PREBBLE.